(12) United States Patent
Cross et al.

(10) Patent No.: US 10,761,250 B2
(45) Date of Patent: Sep. 1, 2020

(54) PHOTO-LUMINESCENT VISUAL ELEMENTS, SYSTEMS AND METHODS

(71) Applicant: Nanolumens Acquisition, Inc., Norcross, GA (US)

(72) Inventors: Robert J. Cross, Alpharetta, GA (US); Richard C. Cope, Duluth, GA (US); Jorge Perez-Bravo, Alpharetta, GA (US); Gary Feather, Norcross, GA (US); Theodore Heske, III, Suwanee, GA (US)

(73) Assignee: Nanolumens Acquistion, Inc., Peachtree Corners, GA (US)

( * ) Notice: Subject to any disclaimer, the term of this patent is extended or adjusted under 35 U.S.C. 154(b) by 372 days.

(21) Appl. No.: 15/972,833

(22) Filed: May 7, 2018

(65) Prior Publication Data

US 2018/0252851 A1  Sep. 6, 2018

Related U.S. Application Data

(63) Continuation of application No. 15/586,425, filed on May 4, 2017, now Pat. No. 9,964,675, which is a continuation of application No. 15/004,310, filed on Jan. 22, 2016, now Pat. No. 9,651,724.

(60) Provisional application No. 62/107,573, filed on Jan. 26, 2015.

(51) Int. Cl.
| | |
|---|---|
| *G02B 5/22* | (2006.01) |
| *G09F 13/20* | (2006.01) |
| *G02F 1/01* | (2006.01) |
| *G09F 13/22* | (2006.01) |
| *F21Y 115/10* | (2016.01) |

(52) U.S. Cl.
CPC ............. *G02B 5/22* (2013.01); *G02F 1/0126* (2013.01); *G09F 13/20* (2013.01); *G09F 13/22* (2013.01); *F21Y 2115/10* (2016.08)

(58) Field of Classification Search
CPC ......... G02B 5/22; G02F 1/0126; G09F 13/22; G09F 13/20; F21Y 2115/10
USPC ....................................................... 359/885
See application file for complete search history.

(56) References Cited

U.S. PATENT DOCUMENTS

| | | | |
|---|---|---|---|
| 5,759,671 | A | 6/1998 | Tanaka |
| 5,873,187 | A | 2/1999 | Kozak |
| 5,961,072 | A | 10/1999 | Bodle |
| 6,364,498 | B1 | 4/2002 | Burbank |
| 6,753,096 | B2 | 6/2004 | Duggal |
| 7,937,865 | B2 | 5/2011 | Li |

(Continued)

*Primary Examiner* — Jade R Chwasz
(74) *Attorney, Agent, or Firm* — Theodore Heske, III

(57) ABSTRACT

Disclosed are embodiments of photo-luminescent display systems and photo-luminescent visual elements creating eye-catching displays of visual advertising or marketing messages that are very effective at generating interest, engagement, and loyalty in the viewing public. Photo-luminescent pigment containing visual elements are illuminated by one or more remotely located emitters at a first wavelength that is outside the human visual spectrum. In response, the visual elements then radiate at one or more wavelengths within the human visual spectrum. Additional features control unwanted reflections and unwanted transmission of radiation at the first wavelength. Additional features control the uniformity of radiation of one or more wavelengths within the human visual spectrum.

17 Claims, 6 Drawing Sheets

(56) References Cited

U.S. PATENT DOCUMENTS

| | | |
|---|---|---|
| 2006/0016109 A1 | 1/2006 | Nicolaas |
| 2010/0230615 A1* | 9/2010 | MacPherson .......... D21H 21/48 |
| | | 250/488.1 |
| 2011/0095579 A1 | 4/2011 | Hill |
| 2012/0033403 A1 | 2/2012 | Lamvik |
| 2012/0233895 A1 | 9/2012 | Martin |
| 2012/0299045 A1 | 11/2012 | Pan |
| 2013/0180139 A1 | 7/2013 | Underwood |
| 2014/0008441 A1 | 1/2014 | Huynh |
| 2015/0197181 A1 | 7/2015 | Salter |
| 2015/0216233 A1 | 8/2015 | Sears |
| 2016/0108310 A1 | 4/2016 | Gu |
| 2016/0183346 A1* | 6/2016 | Hsing .................... H05B 33/10 |
| | | 362/293 |
| 2017/0203686 A1 | 7/2017 | Salter |
| 2017/0259600 A1* | 9/2017 | Aoyama ................ B41M 3/144 |

* cited by examiner

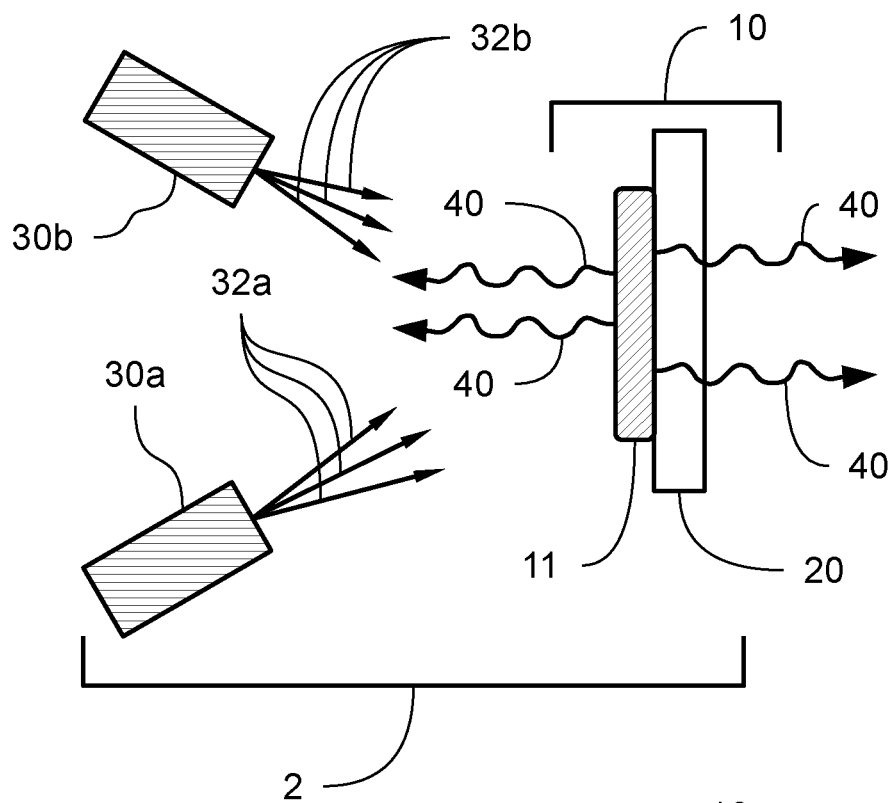
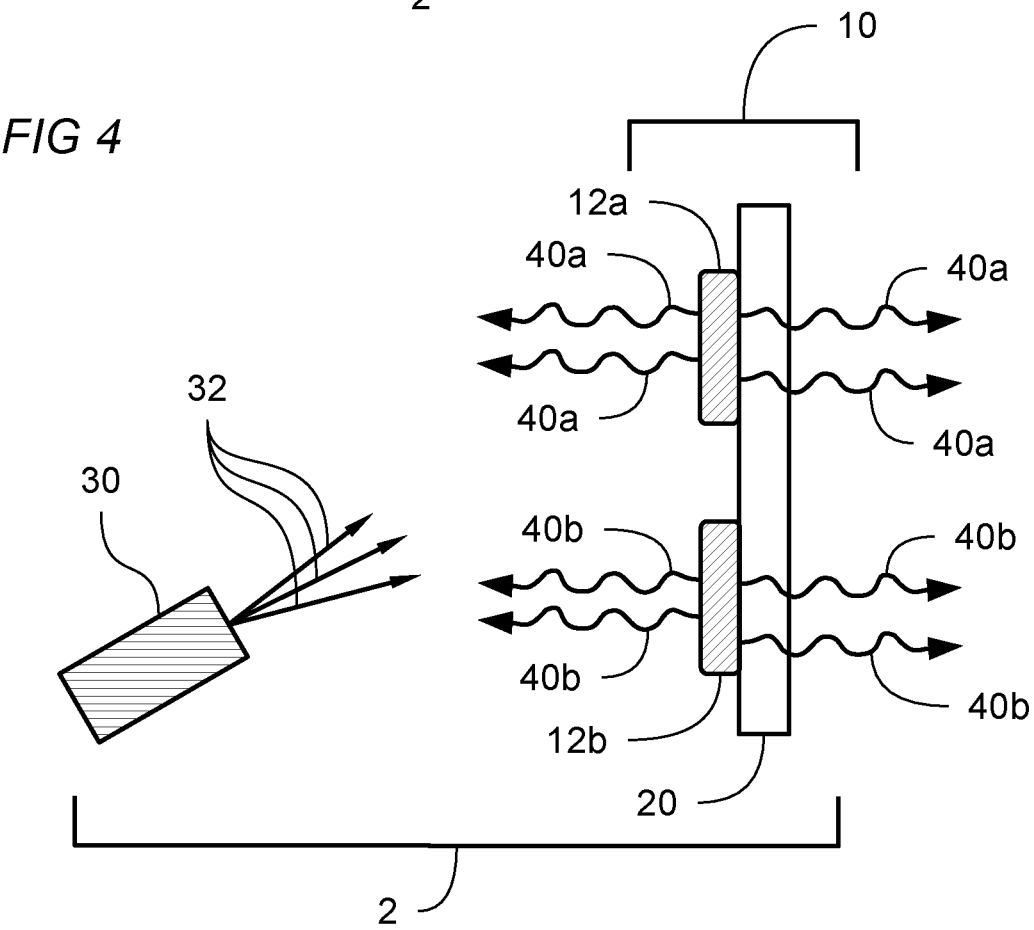

PHOTO-LUMINESCENT VISUAL ELEMENTS, SYSTEMS AND METHODS

CROSS REFERENCE TO RELATED APPLICATIONS

This non-provisional utility application is a continuation of non-provisional utility application Ser. No. 15/586,425, filed May 4, 2017, entitled "Photo-luminescent Visual Elements, Systems and Methods". Application Ser. No. 15/586,425 claimed the benefit of non-provisional utility application Ser. No. 15/004,310, filed Jan. 22, 2016, entitled "Photo-luminescent Display System and Methods". Application Ser. No. 15/004,310 claimed the benefit of U.S. provisional Application No. 62/107,573, filed Jan. 26, 2015, entitled "Photo-luminescent Display System". Application Nos. 62/107,573, 15/004,310, and 15/586,425 are incorporated herein by reference.

STATEMENT REGARDING FEDERALLY SPONSORED RESEARCH OR DEVELOPMENT

Not Applicable.

DESCRIPTION OF ATTACHED APPENDIX

Not Applicable.

BACKGROUND

This invention relates generally to display devices and systems. Display devices and systems are found in a huge variety of contexts encountered in daily life. When used for advertising and marketing, display systems may be used to make the public aware of various brands, products, services, and other items that are of particular interest to their respective advertisers and marketers. Appealing, interesting, and eye-catching displays of visual advertising or marketing messages can be very effective at generating interest, engagement, and loyalty in the viewing public.

Photo-luminescent materials absorb electromagnetic (EM) energy from the sun or from man made light sources. The absorbed EM energy is then radiated at a different wavelength. Some photo-luminescent materials radiate absorbed EM energy quickly while others radiate the absorbed EM energy slowly over the span of minutes to hours. Some photo-luminescent materials absorb EM energy at wavelengths outside the normal human visual spectrum and they radiate EM energy at wavelengths within the normal human visual spectrum. Photo-luminescent materials can be used to create appealing, interesting, and eye-catching visual elements. In consideration of the foregoing points, it is clear that embodiments of the present disclosure confer numerous advantages and are therefore highly desirable.

SUMMARY

The present disclosure is directed to systems and methods that create eye-catching displays of visual advertising or marketing messages. Embodiments of the present disclosure incorporate one or more photo-luminescent visual elements which are activated by one or more remotely located EM emitters to effectively stimulate photo-luminescent emissions of said photo-luminescent visual elements.

Exemplary Embodiment 1.0 {a Minimal System}

A display system according to an embodiment of the present disclosure comprises: a photo-luminescent visual element receiving, from an emitter, an incoming electromagnetic radiation at a first wavelength and radiating an outgoing electromagnetic radiation at a second wavelength; said emitter producing said incoming electromagnetic radiation such that at least a portion of said photo-luminescent visual element is illuminated; said first wavelength located outside of the visible spectrum; said second wavelength located in the visible spectrum; and said emitter further characterized in that it is located remotely from said photo-luminescent visual element.

Exemplary Embodiment 1.1 {1.0 Plus More than One Emitter}

In a related embodiment, a display system according to an embodiment of the present disclosure comprises: a photo-luminescent visual element receiving, from one or more emitters, incoming electromagnetic radiation at a first wavelength and radiate an outgoing electromagnetic radiation at a second wavelength; said one or more emitters producing said incoming electromagnetic radiation such that at least a portion of said photo-luminescent visual element is illuminated; said first wavelength located outside of the visible spectrum; said second wavelength located in the visible spectrum; and said emitter further characterized in that it is located remotely from said photo-luminescent visual element.

Exemplary Embodiment 1.2 {1.1 Plus More than One Visual Element}

In a related embodiment, a display system according to an embodiment of the present disclosure comprises: a plurality of photo-luminescent visual elements receiving, from one or more emitters, incoming electromagnetic radiation at a first wavelength and radiate an outgoing electromagnetic radiation at a second wavelength; said one or more emitters producing said incoming electromagnetic radiation such that at least a portion of said plurality of photo-luminescent visual elements are illuminated; said first wavelength located outside of the visible spectrum; said second wavelength located in the visible spectrum; and said emitter further characterized in that it is located remotely from said photo-luminescent visual element.

Exemplary Embodiment 2.0 {Basic System 1.0 Plus a Substrate on which the Pigment is Coupled, Viewing Plane is Substantially Transparent to Second Wavelength}

A display system according to an embodiment of the present disclosure comprises: a substrate having a pigment side and a viewing side; coupled to said pigment side of said substrate a photo-luminescent pigment receiving from an emitter an incoming electromagnetic radiation at a first wavelength and radiating an outgoing electromagnetic radiation at a second wavelength; said emitter producing said incoming electromagnetic radiation such that at least a portion of said photo-luminescent pigment is illuminated; said first wavelength located outside of the visible spectrum; said second wavelength located in the visible spectrum; said emitter further characterized in that it is located remotely from said photo-luminescent visual element; and, said substrate at least partially transparent to said second wavelength.

Exemplary Embodiment 2.0a

The embodiment of 2.0 further characterized in that the viewing side and the pigment side are the same side.

Exemplary Embodiment 2.1 {Basic System 2.0 Plus the Outgoing EM Radiation is Uniformly Viewable from Both Sides}

The system according to embodiment 2.0 additionally characterized in that: the outgoing electromagnetic radiation at said second wavelength comprises an obverse portion passing through said substrate and a reverse portion that does not pass through said substrate, and further characterized in that the energy contents of said obverse portion and said reverse portion differ by no more than the least noticeable difference. In some applications the least noticeable difference is about 20% or less, in other applications it is about 10% or less, and in still other applications it is about 5% or less.

Exemplary Embodiment 2.2 {2.0 Plus Substrate is Substantially Opaque to First Wavelength}

The system of according to embodiment 2.0 additionally characterized in that: said substrate is substantially opaque to said first wavelength.

Exemplary Embodiment 2.3 {2.0 Plus a Second Substrate Between the Emitter and the Pigment}

A display system according to an embodiment of the present disclosure comprises: a first substrate having a pigment side and a viewing side; coupled to said pigment side of said first substrate a photo-luminescent pigment receiving, from an emitter, an incoming electromagnetic radiation at a first wavelength and radiating an outgoing electromagnetic radiation at a second wavelength; a second substrate disposed between said emitter and said photo-luminescent pigment such that at least a portion of said incoming electromagnetic radiation passes through said second substrate; said emitter producing said incoming electromagnetic radiation such that at least a portion of said photo-luminescent pigment is illuminated; said first wavelength located outside of the visible spectrum; said second wavelength located in the visible spectrum; said emitter further characterized in that it is located remotely from said photo-luminescent pigment; said first substrate and said second substrate substantially transparent to said second wavelength; and, said second substrate at least partially transparent to said first wavelength.

Exemplary Embodiment 2.4 {System 2.3 Plus the Outgoing EM Radiation is Uniformly Viewable from Both Sides}

The system according to embodiment 2.0 additionally characterized in that: the outgoing electromagnetic radiation at said second wavelength comprises an obverse portion passing through said first substrate and a reverse portion passing through said second substrate, and further characterized in that the energy contents of said obverse portion and said reverse portion differ by no more than about the least noticeable difference. In some applications the least noticeable difference is about 20% or less, in other applications it is about 10% or less, and in still other applications it is about 5% or less.

Exemplary Embodiment 3.0 {Adding Reflection Control Features to Planar Substrate}

A display system according to an embodiment of the present disclosure comprises: a photo-luminescent visual element receiving an incoming electromagnetic radiation at a first wavelength and radiating an outgoing electromagnetic radiation at a second wavelength; a planar substrate at least partially transparent at said first wavelength and disposed between an emitter and said photo-luminescent visual element, said emitter producing polarized electromagnetic radiation at said first wavelength and in a direction oriented to impinge upon said planar substrate at an angle about the angle defined by the Brewster's angle between air and said planar substrate; said first wavelength located outside of the visible spectrum; and, said second wavelength located in the visible spectrum.

Exemplary Embodiment 4.0 {in which the Photo-Luminescent Material is Nearly Invisible Under Ordinary Light}

A photo-luminescent visual element according to an embodiment of the present disclosure comprises: a photo-luminescent region coupled to a substrate, said photo-luminescent region operative to receive an incoming electromagnetic radiation at a first wavelength and radiate an outgoing electromagnetic radiation at a second wavelength; said photo-luminescent region additionally characterized in that it is substantially transparent to wavelengths in the range of 400 nanometers to 700 nanometers; and, wherein said substrate is at least partially transparent to said second wavelength.

Exemplary Embodiment 5.0 {Self Supporting Structure of Photo-Luminescent Pigment and Transparent Binder}

A photo-luminescent visual element according to an embodiment of the present disclosure comprises: a photo-luminescent pigment dispersed in a substantially rigid binder, said photo-luminescent pigment operative to receive an incoming electromagnetic radiation at a first wavelength and radiate an outgoing electromagnetic radiation at a second wavelength; said binder further characterized in that it is at least partially transparent to said first wavelength and at least partially transparent to said second wavelength; said binder shaped into an object having a first planar surface through which said incoming electromagnetic radiation passes and a second planar surface through which a portion of said outgoing electromagnetic radiation passes.

Exemplary Embodiment 5.1 {Self Supporting Structure of Photo-Luminescent Pigment and Transparent Binder Plus Low Reflection Emitter Arrangment}

A photo-luminescent visual element according to an embodiment of the present disclosure comprises: a photo-luminescent pigment dispersed in a rigid binder, said photo-luminescent pigment operative to receive, from an emitter, an incoming electromagnetic radiation at a first wavelength and radiate an outgoing electromagnetic radiation at a second wavelength; said binder further characterized in that it is at least partially transparent to said first wavelength and at least partially transparent to said second wavelength; said binder shaped into an object having a first planar surface through which said incoming electromagnetic radiation passes and a second planar surface through which a portion of said outgoing electromagnetic radiation passes; said emitter producing polarized electromagnetic radiation at said first wavelength and in a direction oriented to impinge upon said first planar surface at an angle about the angle defined by the Brewster's angle between air and said binder.

Exemplary Embodiment 6.0 {Self Supporting Structure of Photo-Luminescent Pigment Fused to a Glass Viewing Plane}

A photo-luminescent visual element according to an embodiment of the present disclosure comprises: a planar substrate having both a viewing side and a pigment side; a photo-luminescent pigment fused on to said pigment side, said photo-luminescent pigment operative to receive an incoming electromagnetic radiation at a first wavelength and radiate an outgoing electromagnetic radiation at a second wavelength; said planar substrate further characterized in that it is at least partially transparent to said second wavelength; said planar substrate shaped such that at least a portion of said outgoing electromagnetic radiation passes through said viewing side; the photo-luminescent visual element further characterized in that: said outgoing electromagnetic radiation at said second wavelength comprises an obverse portion passing through said planar substrate and a reverse portion not passing through said planar substrate, and further characterized in that the energy contents of said obverse portion and said reverse portion differ from each other by no more than about the least noticeable difference. In some applications the least noticeable difference is about 20% or less, in other applications it is about 10% or less, and in still other applications it is about 5% or less.

Exemplary Embodiment 6.1 {Self Supporting Structure of Photo-Luminescent Pigment Fused to a Glass Viewing Plane, Pigment is Essentially Transparent at Visible Wavelengths}

A photo-luminescent visual element according to an embodiment of the present disclosure comprises: a planar substrate having both a viewing side and a pigment side; a photo-luminescent pigment fused onto said pigment side, said photo-luminescent pigment operative to receive an incoming electromagnetic radiation at a first wavelength and radiate an outgoing electromagnetic radiation at a second wavelength; said planar substrate further characterized in that it is at least partially transparent to said second wavelength; said planar substrate shaped such that at least a portion of said outgoing electromagnetic radiation passes through said viewing side; and said photo-luminescent pigment additionally characterized in that it is substantially transparent to wavelengths in the range of 400 nm to 700 nm.

Exemplary Embodiment 6.1a

The embodiment of 6.1 further characterized in that the viewing side and the pigment side are the same side.

Exemplary Embodiment 6.2 {Self Supporting Structure of Photo-Luminescent Pigment Fused Between Two Glass Planes}

A photo-luminescent visual element according to an embodiment of the present disclosure comprises: a first planar substrate having both a viewing side and a pigment side; a photo-luminescent pigment fused onto said pigment side of said first planar substrate; a second planar substrate having both a viewing side and a pigment side; said pigment side of said second planar substrate fused to said pigment side of said first planar substrate, said photo-luminescent pigment operative to receive an incoming electromagnetic radiation at a first wavelength and radiate an outgoing electromagnetic radiation at a second wavelength; said first planar substrate further characterized in that it is at least partially transparent to said second wavelength; said first planar substrate shaped such that at least a portion of said outgoing electromagnetic radiation passes through said viewing side; said second planar substrate further characterized in that it is at least partially transparent to said first wavelength; said second planar substrate shaped such that at least a portion of said incoming electromagnetic radiation passes through said viewing side.

Exemplary Embodiment 6.3 {Self Supporting Structure of Photo-Luminescent Pigment Fused Between Two Glass Planes, Pigment being Transparent to Visible Light}

A photo-luminescent visual element according to an embodiment of the present disclosure comprises: a first planar substrate having both a viewing side and a pigment side; a photo-luminescent pigment fused onto said pigment side of said first planar substrate; a second planar substrate having both a viewing side and a pigment side; said pigment side of said second planar substrate fused to said pigment side of said first planar substrate, said photo-luminescent pigment operative to receive an incoming electromagnetic radiation at a first wavelength and radiate an outgoing electromagnetic radiation at a second wavelength; said first planar substrate further characterized in that it is at least partially transparent to said second wavelength; said first planar substrate shaped such that at least a portion of said outgoing electromagnetic radiation passes through said viewing side; said second planar substrate further characterized in that it is at least partially transparent to said first wavelength; said second planar substrate shaped such that at least a portion of said incoming electromagnetic radiation passes through said viewing side; and said photo-luminescent pigment additionally characterized in that it is substantially transparent to wavelengths in the range of 400 nm to 700 nm.

Exemplary Embodiment 7.0 {Edge Lit Substrate in Contact with a Pattern of Photo-Luminescent Pigment Regions which Collectively Create One or More Photo-Luminescent Visual Elements when Viewed from a Viewing Distance}

A display system according to an embodiment of the present disclosure comprises: an emitter producing an incoming electromagnetic (EM) radiation at a first wavelength outside of the visual spectrum, the emitter being optically coupled to a photo-luminescent visual element; said photo-luminescent visual element comprising: a planar substrate having at least one edge adapted to accept said incoming EM radiation; and a plurality of photo-luminescent regions in contact with said planar substrate in which each photo-luminescent region receives a portion of said incoming EM radiation and in which each photo-luminescent region produces by means of photo-luminescence an outgoing EM radiation having a wavelength within the visible spectrum.

BRIEF DESCRIPTION OF THE DRAWINGS

These and other features, aspects, and advantages of the present invention will become better understood with regard to the following description, appended claims, and accompanying drawings where:

FIG. 3 shows a cross sectional schematic view according to another embodiment of the present disclosure having one or more emitters.

FIG. 4 shows a cross sectional schematic view according to another embodiment of the present disclosure in which a photo-luminescent visual element has one or more photo-luminescent regions.

LIST OF REFERENCE NUMBERS APPEARING IN THE FIGURES

Figure 1A:
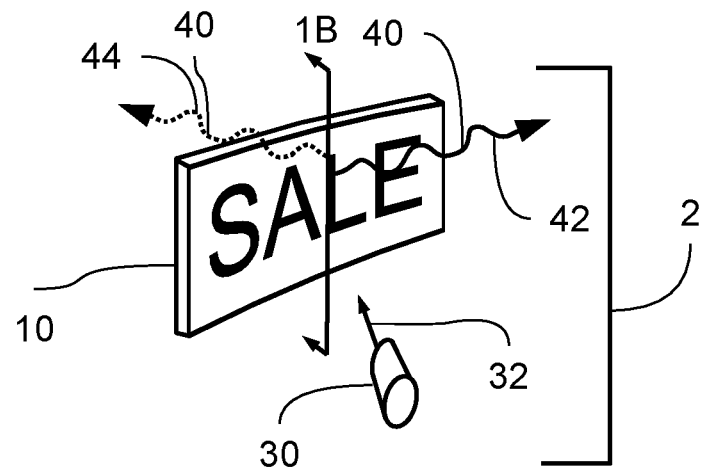
FIG. 1A shows a perspective view of a photo-luminescent display system according to the present disclosure. Cross section 1B is indicated on this figure.

2—photo-luminescent display system
10—photo-luminescent visual element
10a, 10b—first, second photo-luminescent visual element
11—photo-luminescent pigment
12—photo-luminescent region
12a, 12b, etc.—first, second, etc. photo-luminescent region
13—photo-luminescent pigment dispersed in a binder
20—substrate
20a, 20b—first, second substrates
22—binder
24—planar substrate
24a, 24b—first, second planar substrates
25—planar surface
25a, 25b—first, second planar surface
26—pigment side
27—substrate edge
28—viewing side
30—emitter
30a, 30b—first, second emitter
31—angle of incidence
32—incoming EM radiation at a first wavelength
32a, 32b—first, second incoming EM radiation
34—polarized incoming EM radiation at a first wavelength
34a, 34b—first, second polarized incoming EM radiation
40—outgoing EM radiation at a second wavelength
40a, 40b—first, second outgoing EM radiation
42—obverse portion of outgoing radiation
44—reverse portion of outgoing radiation

DESCRIPTION

Embodiments of the present disclosure provide photo-luminescent display systems and photo-luminescent visual elements suitable for use in such systems. In particular, the present disclosure describes photo-luminescent display systems and elements that improve the ability to create compelling, interesting, and eye-catching displays.

Photo-luminescent materials have the following useful property: they absorb electromagnetic (EM) energy at one wavelength and then radiate EM energy at a second wavelength. Depending upon the specific material used, a photo-luminescent material may absorb incoming EM radiation at one or more wavelengths and may radiate outgoing EM radiation at one or more wavelengths. A mixture of photo-luminescent materials may absorb a range of wavelengths while radiating a range of wavelengths. Thus photo-luminescent materials may be selected to suit a variety of particular applications.

Preferred photo-luminescent materials in the present disclosure absorb wavelengths in the ultraviolet (UV), below about 400 nanometers, while radiating in the range visible to humans, from around 400 nanometers up to around 700 nanometers. Examples of inorganic photo-luminescent materials include alkaline earth aluminates doped with rare earths, such as strontium aluminate, and zinc sulfide doped with copper. Many other photo-luminescent materials are known in the art and are able to be used in the apparatus and systems of the present disclosure.

Embodiments of the present disclosure create one or more photo-luminescent visual elements and illuminate those elements by means of one or more remote emitters. Each photo-luminescent visual element contains one or more photo-luminescent pigments. The remote emitter or emitters provide an incoming electromagnetic radiation to the photo-luminescent pigments at a first wavelength that is effective for being absorbed by the photo-luminescent pigment. After absorbing the incoming EM radiation, the pigment may then radiate a second wavelength of light as outgoing EM radiation. In preferred embodiments, the first wavelength is outside of the visual range of humans and the second wavelength is within the visual range of humans. Shaping the photo-luminescent pigment into one or more symbols, logos, letters, pictures, etc., and illuminating the pigment via one or more emitters creates an eye-catching impression in which a display emits a glow in the form of the shaped pigment and in which the source of illumination is not obvious because the emitter is operating in a wavelength or range of wavelengths that is mostly, substantially, or entirely outside of the human visual range.

In some embodiments of the present disclosure, photo-luminescent pigment may be shaped into a thin layer that is effective for allowing the outgoing EM radiation to be visible from all directions. The density and deposition of the pigment layer may be controlled so that outgoing EM radiation energy is substantially uniformly distributed thereby producing a visual impression upon the viewer that the visual article is glowing with about the same intensity when viewed from more than one angle.

Incoming EM radiation may be absorbed by a photo-luminescent pigment from a substantially unidirectional source while outgoing EM radiation is emitted omni-directionally. A thin layer or a volume of sufficiently dispersed photo-luminescent pigment will allow the incoming EM radiation to reach a substantial portion of the photo-luminescent pigment for absorption. This improves the uniformity of the outgoing EM radiation emitted by the photo-luminescent pigment. In addition, a thin layer or a volume of sufficiently dispersed photo-luminescent pigment will allow a substantial portion of the emitted radiation to exit the photo-luminescent visual element without being absorbed. Thus the perception in the eye of the viewer of substantially uniform brightness of photo-luminescent emission is improved by thinly layered or thin volumetrically dispersed photo-luminescent pigments.

In some embodiments of the present disclosure, photo-luminescent pigment may be selected and applied to or otherwise incorporated into a visual element so that the pigment is substantially transparent to visible light. Such a visual element would be nearly invisible when the emitter is not emitting a wavelength effective for absorption by the photo-luminescent pigment. Upon receiving a wavelength effective for absorption by the photo-luminescent pigment the one or more symbols, logos, letters, pictures, etc. would appear to the viewer and produce a pleasing surprise and thereby very effectively convey an advertising or marketing message.

Embodiments of the present disclosure benefit from locating the emitter remotely from the visual element, enhancing the surprise quality of the visual effect by avoiding drawing attention to the emitter. The photo-luminescent visual element can stand by itself at its own location and thereby draw the viewer's attention more effectively. Locating the emitter remotely from the visual element has other benefits. The uniformity of power density present in the incoming EM radiation may be improved by moving the emitter farther away from the photo-luminescent visual element. The uniformity of the outgoing EM radiation may be improved as a consequence of improving the uniformity of the incoming EM radiation.

In general, devices making use of UV or near UV light need to be designed to ensure eye safety. Various embodiments of the present disclosure address eye safety needs. In preferred embodiments the cumulative power and spectral output of the one or more emitters is intrinsically eye-safe. In some embodiments, an emitter may produce polarized light having an angle of incidence with respect to the substrate in which or on which the photo-luminescent pigment is located. When the polarized incoming EM radiation arrives at the substrate with an angle of incidence equal to about the Brewster's angle then very little reflection may be produced. This has the effect of controlling reflections to a very substantial degree at the same time that the incoming EM radiation is transmitted into the substrate with high efficiency. It is noted that the Brewster's angle in these embodiments is given by a formula involving the index of refraction of the substrate and that of air according to the equation: Brewster's Angle=arctangent (refractive index of substrate/refractive index of air).

Further UV control may be obtained in other embodiments. In an embodiment where an emitter illuminates a photo-luminescent visual element from one side while the visual element is being viewed from the opposite side, a substrate that is at least partially transparent to visible light and at least partially opaque to UV may be interposed between the emitter and the viewer to intercept unwanted UV on its way to the viewer.

Embodiments of the present disclosure describe a number of ways in which a photo-luminescent pigment may be coupled with or combined with a substrate suitable for the variety of applications contemplated: a photo-luminescent pigment may be combined with a binder or adhesive for surface application to a suitable transparent or translucent substrate; photo-luminescent pigments having sufficiently high temperature stability may be infused, fused, sintered, or even encapsulated on or in compatible plastic, glass, or glass-like substrates; pigments compatible with plastics, rubber compounds, urethanes, epoxies, may be dispersed, layered, or mixed into such binders thereby creating photo-luminescent composite materials. All of the foregoing methods may be used to create rigid photo-luminescent visual elements capable of supporting their own weight.

Turning now to FIG. 1A, an embodiment of a photo-luminescent display system 2 according to the present disclosure is shown comprising: photo-luminescent visual element 10 receiving, from a remotely located emitter 30, incoming electromagnetic (EM) radiation 32 at a first wavelength; the photo-luminescent visual element radiating outgoing electromagnetic radiation 40 at a second wavelength in response to receiving said incoming EM radiation; emitter 30 producing said incoming EM radiation such that at least a portion of said photo-luminescent visual element 10 is illuminated; said first wavelength located outside of the visible spectrum; said second wavelength located in the visible spectrum; and said emitter further characterized in that it is located remotely from said photo-luminescent visual element. The outgoing EM radiation may comprise an obverse portion 42 and a reverse portion 44, both portions emanating from the photo-luminescent visual element and traveling in different directions. The visual content of photo-luminescent visual element 10 can be viewed from both sides of the element.

Figure 1B:
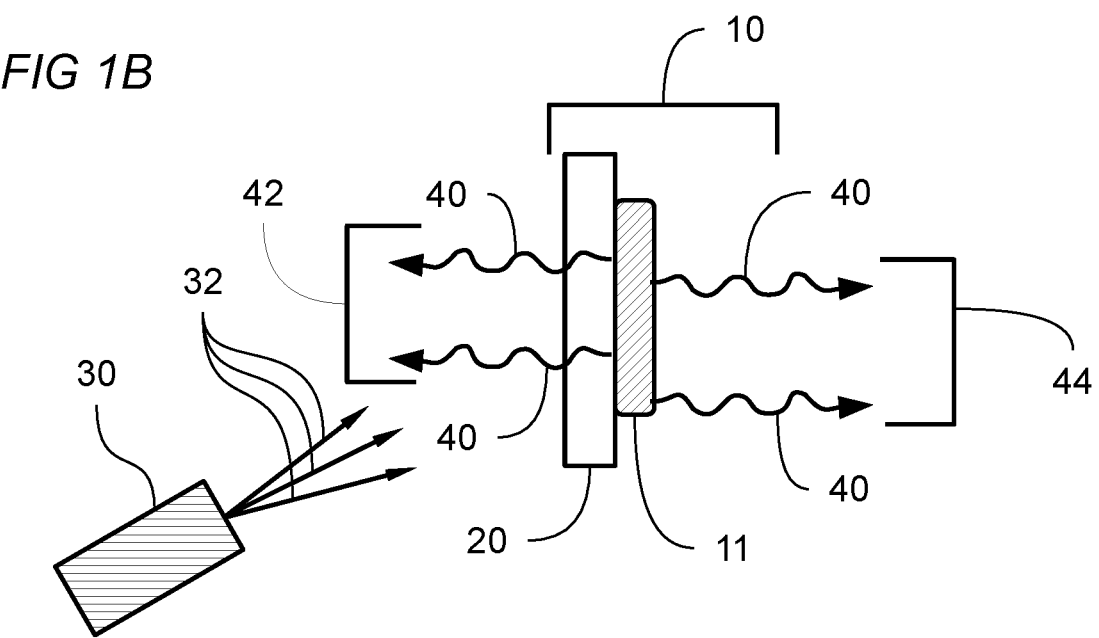
FIG. 1B shows a cross sectional view the photo-luminescent visual element and an emitter corresponding to FIG. 1A.

Shown in FIG. 1B is a cross section of the photo-luminescent visual element and emitter of FIG. 1A. An embodiment of a photo-luminescent visual element 10 is shown comprising a photo-luminescent pigment 11 coupled to a substrate 20. Emitter 30 produces incoming EM radiation 32 at a first wavelength, at least a portion of which is absorbed by said photo-luminescent pigment 11 and then radiated as an outgoing EM radiation 40 at a second wavelength. An obverse portion 42 of outgoing EM radiation 40 passes through substrate 20, while a reverse portion 44 of outgoing EM radiation 40 does not pass through the substrate. In preferred embodiments, said first wavelength is outside the visible spectrum while said second wavelength is within the visible spectrum. Preferred embodiments of photo-luminescent visual element 10 use substrate materials that are substantially transparent to said second wavelength, such as glass or acrylic. Effectively thin or dispersed applications of photo-luminescent pigment 11 create the benefit that the energy contents of said obverse portion and said reverse portion differ from each other by no more than about 30%. This produces an impression of nearly equal radiance of obverse and reverse portions in the eye of the viewer and may be highly desirable in some applications.

The difference between said obverse portion and said reverse portion may also be characterized in terms of a least noticeable difference in intensity as judged by the human eye. The least noticeable difference may be defined in a ratio-metric way as the quotient (difference in intensity)/(absolute intensity of the obverse portion). Depending on the individual viewing the photo-luminescent visual element, the least noticeable difference between the obverse portion and the reverse portion may be about 20% or less, in other applications it may be about 10% or less, and in still other applications it may be about 5% or less.

Figure 2A:
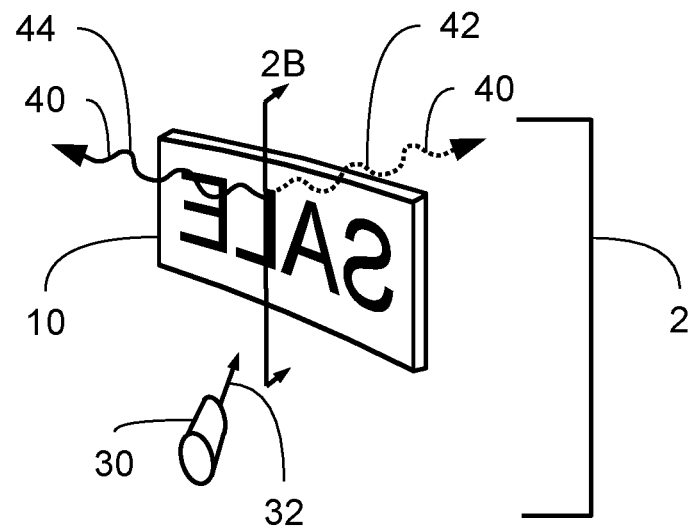
FIG. 2A shows a perspective view of a photo-luminescent display system according to another embodiment of the present disclosure. Sectional view 2B is indicated in this figure.

FIG. 2A shows an embodiment similar to that shown in FIG. 1A, differing in the placement of the remote emitter. FIG. 1A and FIG. 2A taken together show that embodiments of the present disclosure comprise photo-luminescent visual elements that can be illuminated at a first wavelength by an emitter remotely positioned in any one of a variety of placements and that the subsequent photo-luminescent visual elements can then be viewed at a second wavelength from many different angles.

Figure 2B:
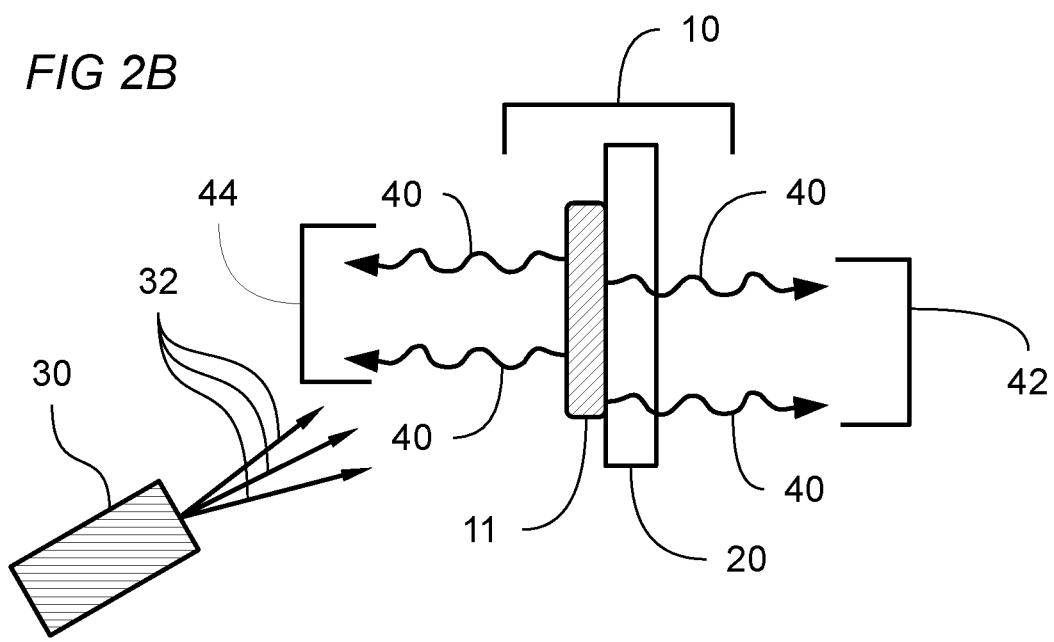
FIG. 2B shows a cross sectional view the photo-luminescent visual element and an emitter corresponding to FIG. 2A.

Shown in FIG. 2B is a cross section of the photo-luminescent visual element and emitter of FIG. 2A. An embodiment of a photo-luminescent visual element 10 is shown comprising a photo-luminescent pigment 11 coupled to a substrate 20. Emitter 30 produces incoming EM radiation 32 at a first wavelength, at least a portion of which is absorbed by said photo-luminescent pigment 11 and then radiated as an outgoing EM radiation 40 at a second wavelength. An obverse portion 42 of outgoing EM radiation 40 passes through substrate 20, while a reverse portion 44 of outgoing EM radiation 40 does not pass through the substrate. In preferred embodiments, first wavelength is outside the visible spectrum while the second wavelength is with the visible spectrum. Preferred embodiments of photo-luminescent visual element 10 use substrate materials that are substantially transparent to said second wavelength, such as glass or acrylic. Effectively thin or dispersed applications of photo-luminescent pigment 11 create the benefit that the energy contents of said obverse portion and said reverse portion differ from each other by no more than about the least noticeable difference. This produces an impression of nearly equal radiance of obverse and reverse portions in the eye of the viewer.

Turning now to FIG. 3, shown is a schematic cross section view according to another embodiment of the present disclosure having more than one emitter. An embodiment of a photo-luminescent display system 2 according to the present disclosure is shown comprising: a remotely located first emitter 30a radiating a first incoming electromagnetic (EM) radiation 32a at a first wavelength; a remotely located second emitter 30b radiating a second incoming EM radiation 32b at said first wavelength; a photo-luminescent visual element 10 receiving at least a portion of said first incoming EM radiation 32a or at least a portion of said second incoming EM radiation 32b, the photo-luminescent visual element radiating outgoing EM radiation 40 at a second wavelength in response to receiving either of said first incoming EM radiation 32a or said second incoming EM radiation 32b; first emitter 30a producing said first incoming EM radiation 32a such that at least a portion of said photo-luminescent visual element 10 is illuminated; second emitter 30b producing said second incoming EM radiation 32b such that at least a portion of said photo-luminescent visual element 10 is illuminated; said first wavelength located outside of the visible spectrum; said second wavelength located within the visible spectrum; said first emitter 30a further characterized in that it is located remotely from said photo-luminescent visual element; said second emitter 30b further characterized in that it is located remotely from said photo-luminescent visual element. The outgoing EM radiation may comprise an obverse portion and a reverse portion, both portions emanating from the photo-luminescent visual element and traveling in different directions.

Turning now to FIG. 4, shown is a cross sectional schematic view according to another embodiment of the present disclosure in which a photo-luminescent visual element has one or more photo-luminescent regions. An embodiment of a photo-luminescent display system 2 according to the present disclosure is shown comprising: a remotely located emitter 30 producing an incoming EM radiation 32 at a first wavelength directed towards a photo-luminescent visual element 10; said photo-luminescent visual element 10 comprising: a first photo-luminescent region 12a coupled to a substrate 20; a second photo-luminescent region 12b coupled to said substrate; wherein said first photo-luminescent region 12a receives a portion of incoming EM radiation 32 and produces first outgoing EM radiation 40a at a second wavelength; and wherein said second photo-luminescent region 12b receives a portion of incoming EM radiation 32 and produces a second outgoing EM radiation 40b at a third wavelength. Said second and said third wavelengths may be the same or different wavelengths, both within the human visual spectrum.

In consideration of the embodiments of FIG. 3 and FIG. 4, it is within the spirit and scope of the present disclosure to create an embodiment having multiple emitters radiating towards multiple photo-luminescent elements. Furthermore, different photo-luminescent regions may produce outgoing EM radiation at different wavelengths thereby enabling display systems with a spectrum of color characteristics. A plurality of photo-luminescent regions may be used in which a plurality of photo-luminescent pigments radiate at a plurality of wavelengths. The plurality of photo-luminescent regions may also vary in size, thereby providing a wide range of visual effects.

Figure 5:
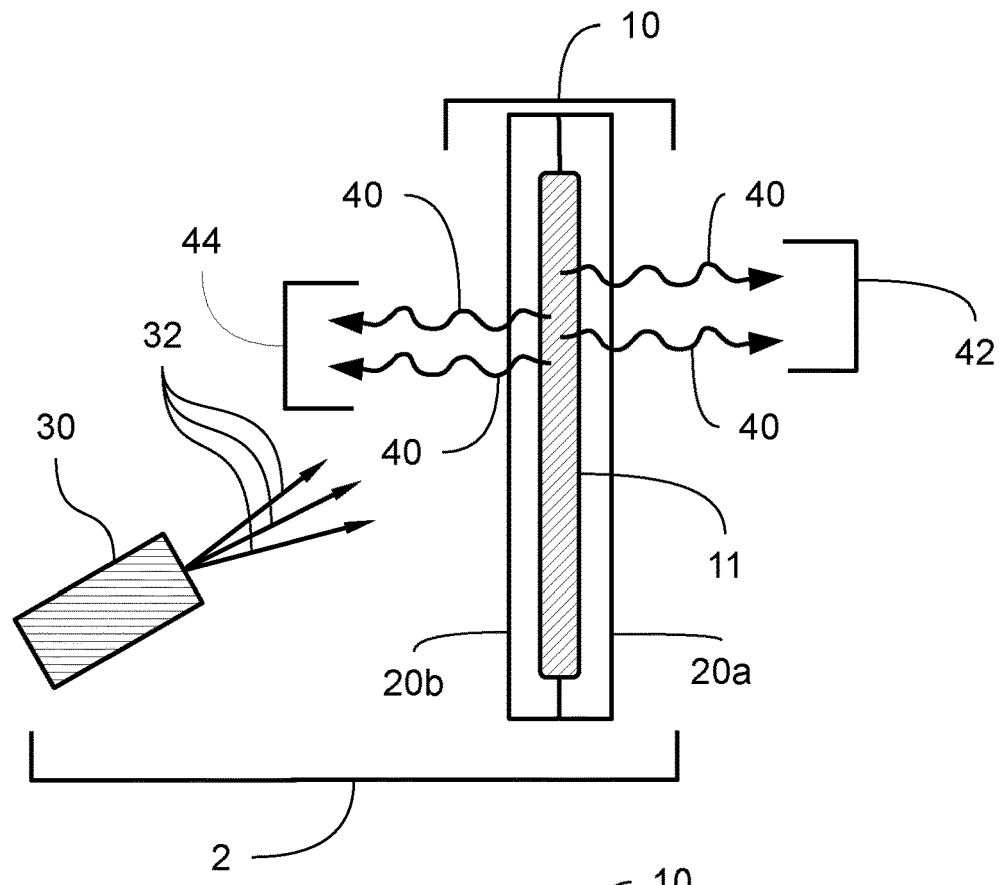
FIG. 5 shows a cross sectional schematic view according to another embodiment of the present disclosure in which a photo-luminescent visual element has a photo-luminescent pigment between a first and a second substrate.

Shown now in FIG. 5 is a system 2 comprising a remotely located emitter 30 producing an incoming EM radiation 32 at a first wavelength and directed toward a photo-luminescent element 10, said photo-luminescent element 10 comprising: a photo-luminescent pigment 11 disposed between a first substrate 20a and a second substrate 20b; the photo-luminescent pigment operative to radiate an outgoing EM radiation 40 at a second wavelength; said outgoing EM radiation comprising both an obverse portion 42 passing through first substrate 20a and a reverse portion 44 passing through second substrate 20b.

The system of FIG. 5 has a number of advantages. Some photo-luminescent pigments may be sensitive to environmental conditions such as temperature, humidity, oxygen, etc. By encapsulating photo-luminescent pigment between two substrates the impact of environmental factors on the operational characteristics and lifetime on the photo-luminescent visual element may be reduced.

Further advantages may be realized from the embodiment of FIG. 5. The substrate that incoming EM radiation at the first wavelength passes through on its way to the photo-luminescent pigment may be selected to substantially pass the first wavelength while the other substrate may be selected to substantially block the first wavelength. Such a configuration has the advantage of blocking most of the energy at the first wavelength that would otherwise pass through the other substrate. In embodiments where the first wavelength is in the UV portion of the spectrum, it may be beneficial to block the transmission through the other substrate of at least a portion of the UV light that was not absorbed by the photo-luminescent pigment. Use of a UV blocking substrate between the photo-luminescent pigment and a viewer may enhance the eye-safety of the system by blocking a portion of the unabsorbed incoming EM radiation that is in the UV band.

With continuing reference to FIG. 5, a sufficiently thin or dispersed layer of photo-luminescent pigment may be used such that the layer appears substantially transparent to wavelengths in the visible spectrum. When exposed to incoming EM radiation at the first wavelength such a layer will radiate at the second wavelength and hence become visible. A variety of eye-catching and useful transparent and semi transparent effects may be produced.

Figure 6:
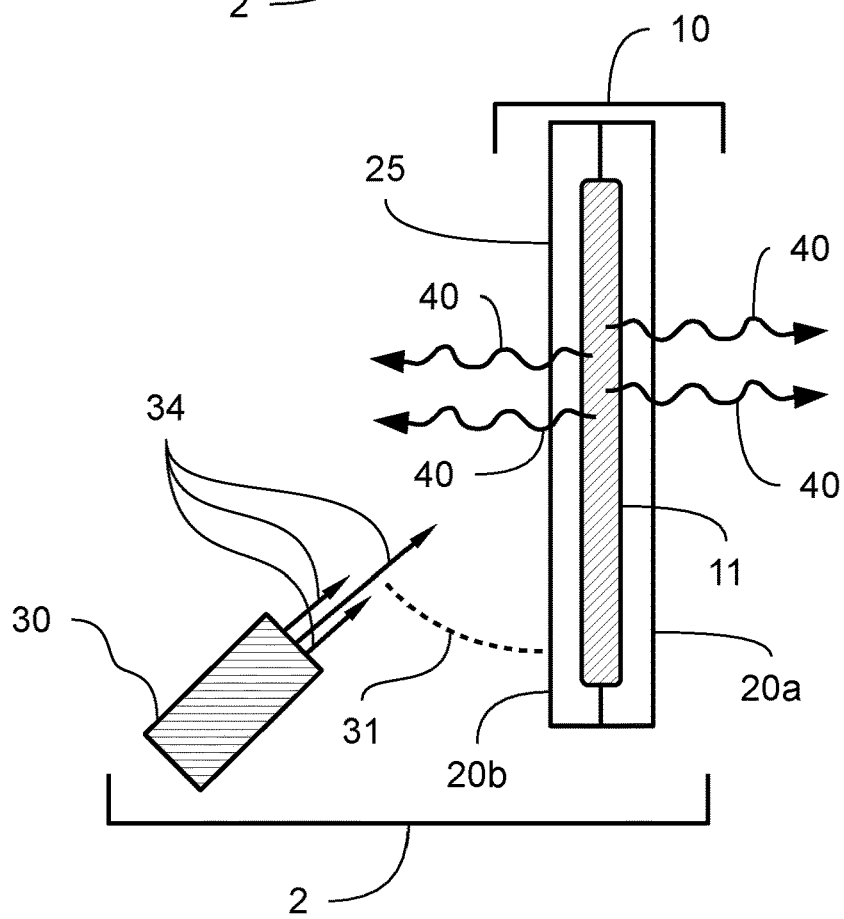
FIG. 6 shows a cross sectional schematic view according to another embodiment of the present disclosure in which an emitter emits a polarized incoming EM radiation having an angle of incidence with respect to a planar substrate.

FIG. 6 shows an embodiment similar to the system of FIG. 5. The embodiment of FIG. 6 is further characterized in that second substrate 20b has a planar surface 25 disposed to receive, at an angle of incidence 31, a polarized incoming EM radiation 34 at a first wavelength. Remotely located emitter 30 produces said polarized incoming EM radiation 34, directing it towards said planar surface 25 at said angle of incidence 31. In preferred embodiments, the direction of polarization and the angle of incidence may be coordinated such that said incoming EM radiation 34 arrives at said planar surface 25 at about the Brewster's angle and produces substantially no reflection of the first wavelength from planar surface 25. When polarized and directed in the described way, reflections from said planar surface may be minimized. Such an arrangement may be used to enhance eye-safety by controlling reflections of the first wavelength from said planar surface.

Figure 7:
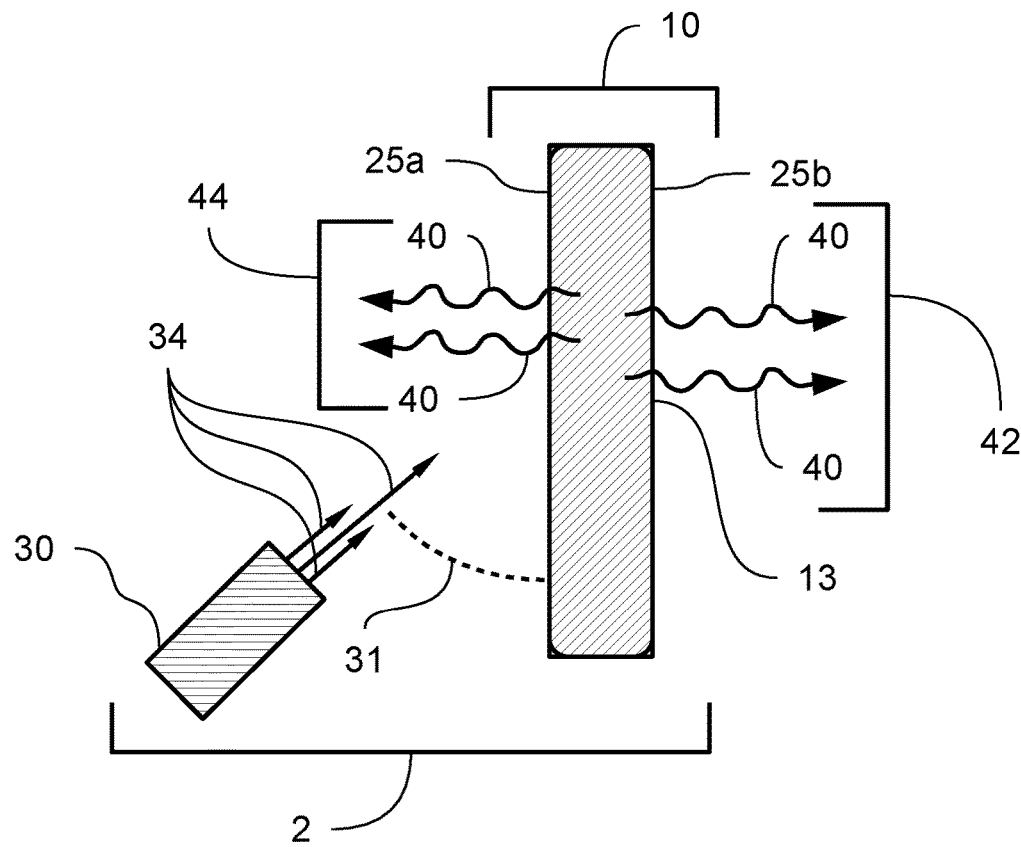
FIG. 7 shows a cross sectional schematic view according to another embodiment of the present disclosure in which a photo-luminescent visual element comprises a photo-luminescent pigment in dispersed in a rigid binder.

Turning now to FIG. 7, shown is a cross sectional schematic view according to another embodiment of the present disclosure in which a photo-luminescent visual element 10 comprises a photo-luminescent pigment dispersed in a binder 13, the composite being sufficiently rigid to maintain its shape under the force of gravity. Emitter 30 produces a incoming EM radiation 34 at a first wavelength that is directed toward said photo-luminescent pigment dispersed in a binder 13 with an angle of incidence 31. The photo-luminescent pigment produces an outgoing EM radiation 40 at a second wavelength, transmitting a reverse portion through a first planar surface 25a and an obverse portion through a second planar surface 25b. In preferred embodiments, the direction of polarization and the angle of incidence may be coordinated such that said incoming EM radiation 34 arrives at said first planar surface 25a at about the Brewster's angle and produces substantially no reflection of the first wavelength from first planar surface 25a.

Depending upon the effect desired, the photo-luminescent pigment in the embodiment of FIG. 7 may be dispersed throughout the majority of the binder or it may be dispersed through only a portion of the binder. The binder is at least partially transparent to the first wavelength and at least partially transparent to the second wavelength.

Figure 8:
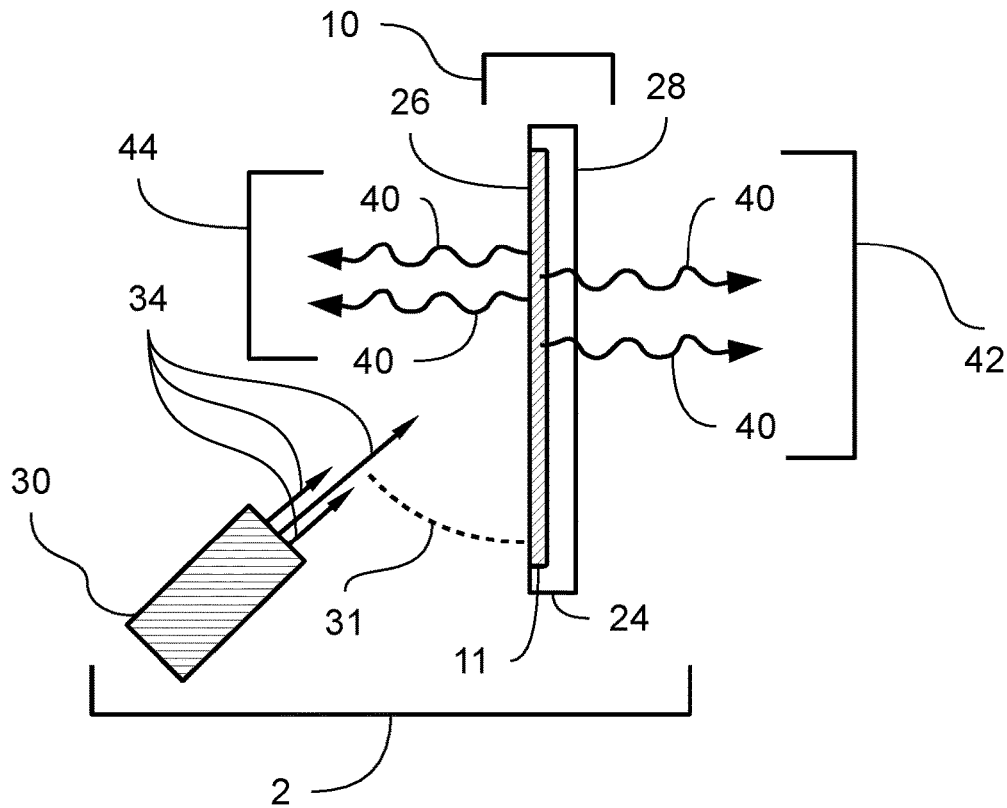
FIG. 8 shows a schematic cross sectional view according to another embodiment of the present disclosure in which a photo-luminescent visual element comprises a photo-luminescent pigment fused to a substrate.

With reference now to FIG. 8, shown is another embodiment of a photo-luminescent display system comprising: an emitter 30 producing an incoming EM radiation 34 directed toward a photo-luminescent visual element 10 comprising: a planar substrate 24 having both a pigment side 26 and a viewing side 28; and, a photo-luminescent pigment 11 fused to said pigment side. Photo-luminescent pigment 11 may be a material chosen to survive elevated temperatures required for fusing it to the pigment side of the substrate. Substrate materials may include glass and acrylic.

Figure 9A:
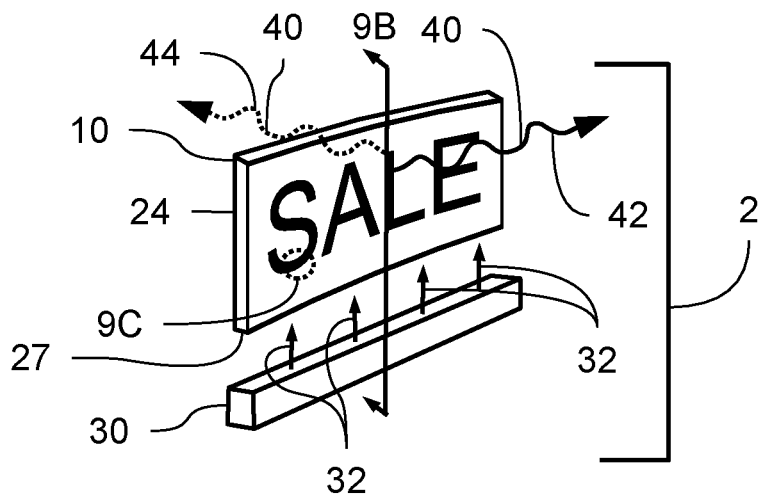
FIG. 9A shows a perspective view of a photo-luminescent display system according to the present disclosure. Cross section 9B and enlargement 9C are both indicated on this figure.

FIG. 9A shows a perspective view of another photo-luminescent display system according to the present disclosure. A photo-luminescent display system 2 according to an embodiment of the present disclosure comprises: an emitter 30 producing an incoming electromagnetic (EM) radiation 32 at a first wavelength outside of the visual spectrum, emitter 30 being optically coupled to a photo-luminescent visual element 10. Photo-luminescent visual element 10 is shown comprising: a planar substrate 24 having at least one substrate edge 27 adapted to accept said incoming EM radiation 32. Photo-luminescent visual element 10 produces an outgoing EM radiation 40 having an obverse portion 42 and a reverse portion 44.

Figure 9B:
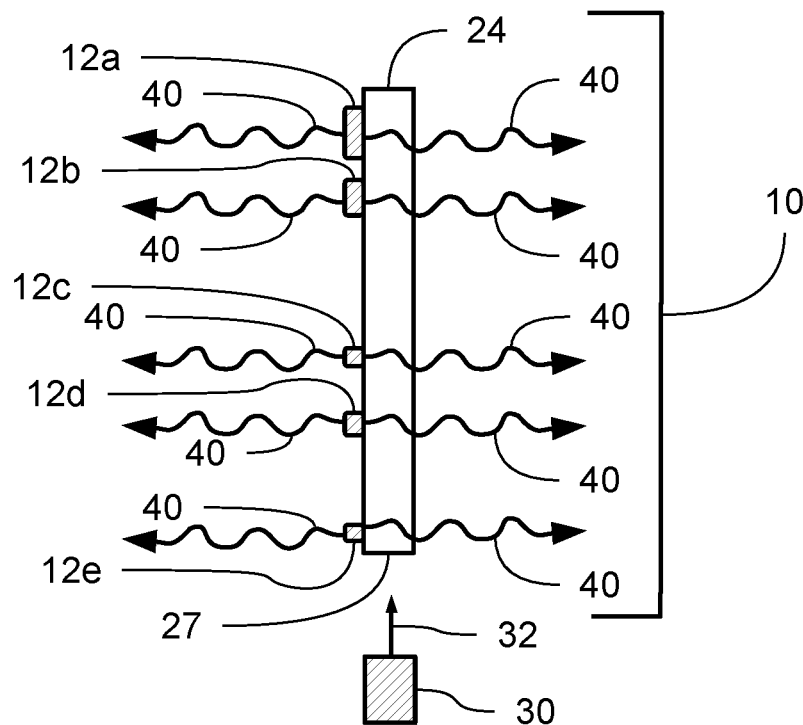
FIG. 9B shows a cross sectional view the photo-luminescent visual element and an emitter corresponding to FIG. 9A.

More detail is visible in cross sectional view FIG. 9B, which shows photo-luminescent visual element 10 comprising a plurality of photo-luminescent regions 12a, 12b, 12c, 12d, and 12e in direct contact with said planar substrate 24 in which each photo-luminescent region receives a portion of said incoming EM radiation 32 and in which each photo-luminescent region produces by means of photo-luminescence an outgoing EM radiation 40 having a wavelength within the visible spectrum. Incoming EM radiation 32 is distributed throughout planar substrate 24 by means of the optical phenomenon of total internal reflection, mainly exiting the planar substrate at the locations in direct contact with any of the plurality of photo-luminescent regions. Each photo-luminescent region thereby receives a portion of incoming EM radiation 32 and then emits outgoing EM radiation at another wavelength by means of photo-luminescence.

Figure 9C:
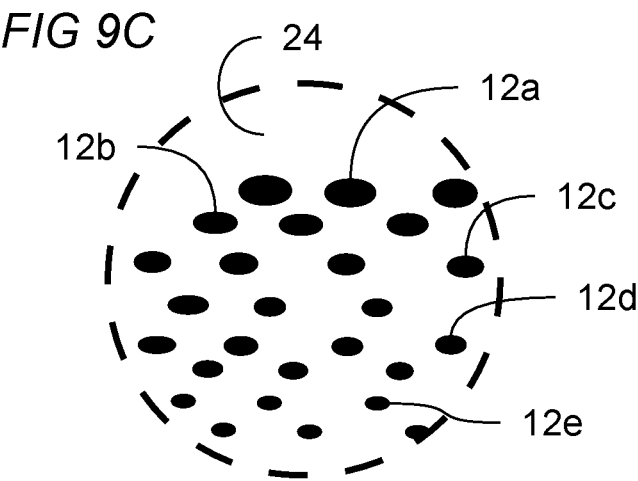
FIG. 9C shows a enlarged view of a plurality of photo-luminescent regions in contact with a planar substrate corresponding to FIG. 9A.

FIG. 9C shows an enlarged view, corresponding to FIG. 9A, of a plurality of photo-luminescent regions 12a, 12b, 12c, 12d, and 12e in contact with planar substrate 24. It is noted that many or few photo-luminescent regions may be used, depending on the subject matter displayed. Furthermore the plurality of photo-luminescent regions may vary in size, position, and composition of photo-luminescent pigment such that different colors and intensities may be produced. In preferred embodiments the size and density of photo-luminescent regions may vary in a predetermined way to create an impression of nearly uniform brightness across the entire photo-luminescent visual element. Due to the logarithmic sensitivity of the human eye, brightness variations of about less than 20% may appear to be nearly uniformly bright. In other preferred embodiments, the geometry and intensity of the emission pattern produced by the emitter may be taken into account when designing a pattern of photo-luminescent regions, thereby creating desirable visual properties for the entire system. In other embodiments, brightness variations of about 10% or less appear to uniformly bright, and in still other embodiments brightness variations of about 5% or less appear to uniformly bright.

Although the present invention has been described in considerable detail with reference to certain preferred versions thereof, other versions are possible. It may be desirable to combine features shown in various embodiments into a single embodiment. A different number and configuration of features may be used to construct embodiments of photo-luminescent display systems and photo-luminescent visual elements that are entirely within the spirit and scope of the present disclosure. Therefor, the spirit and scope of the appended claims should not be limited to the description of the preferred versions contained herein.

Any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" in the claims herein is not intended to invoke the provisions of 35 U.S.C. Section 112, Paragraph 6.

The invention claimed is:

1. A photo-luminescent visual element comprising:
    a) a photo-luminescent pigment coupled to a planar substrate, said photo-luminescent pigment operative to receive incoming electromagnetic radiation at a first wavelength and, in response, emit an outgoing electromagnetic radiation at a second wavelength that is within the human visible spectrum;
    b) a second photo-luminescent pigment coupled to said planar substrate, said second photo-luminescent pigment operative to receive incoming electromagnetic radiation at said first wavelength and, in response, emit an outgoing electromagnetic radiation at a third wavelength that is within the human visible spectrum;
    c) a third photo-luminescent pigment coupled to said planar substrate, said third photo-luminescent pigment operative to receive incoming electromagnetic radiation at said first wavelength and, in response, emit an outgoing electromagnetic radiation at a fourth wavelength that is within the human visible spectrum;
    d) said planar substrate at least partially transparent to each of: said second wavelength; said third wavelength; and, said fourth wavelength;
    e) further characterized in that the outgoing electromagnetic radiation at said second wavelength comprises both an obverse portion and a reverse portion, the brightness of said obverse portion differing from the brightness of said reverse portion by no more than about 30% or less.

2. The photo-luminescent visual element of claim 1 further characterized in that the first wavelength is smaller than about 400 nanometers.

3. The photo-luminescent visual element of claim 1 further characterized in that the second wavelength is greater than said first wavelength and less than about 700 nanometers.

4. The photo-luminescent visual element of claim 1 further characterized in that each of the second wavelength and the third wavelength are greater than said first wavelength and less than about 700 nanometers.

5. The photo-luminescent visual element of claim 1 further characterized in that each of the second wavelength, the third wavelength, and the fourth wavelength are greater than said first wavelength and less than about 700 nanometers.

6. The photo-luminescent visual element of claim 1 further characterized in that the first, the second, and the third photo-luminescent pigments are arranged on said planar substrate in a plurality of photo-luminescent pigment regions.

7. The photo-luminescent visual element of claim 6 further characterized in that a portion of said plurality of photo-luminescent pigment regions are non-overlapping.

8. A photo-luminescent visual element comprising:
    a) a planar substrate having at least one substrate edge adapted to accept an incoming electromagnetic radiation at a first wavelength; said planar substrate configured to retain a portion of said incoming electromagnetic radiation by means of total internal reflection within said planar substrate;
    b) a plurality of photo-luminescent regions in direct contact with said planar substrate; each photo-luminescent region receiving a portion of said incoming electromagnetic radiation;
    c) a first portion of said photo-luminescent regions producing by means of photo-luminescence an outgoing electromagnetic radiation having a second wavelength within the human visible spectrum;
    d) a second portion of said photo-luminescent regions producing by means of photo-luminescence an outgoing electromagnetic radiation having a third wavelength within the human visible spectrum;
    e) a third portion of said photo-luminescent regions producing by means of photo-luminescence an outgoing electromagnetic radiation having a fourth wavelength within the human visible spectrum;
    f) said outgoing electromagnetic radiation at said second wavelength comprising an obverse portion and a reverse portion, each emitted away from opposites sides of said planar substrate;
    g) the photo-luminescent visual element further characterized in that the brightness at said second wavelength of said obverse portion and said reverse portion differ by no more than about 30% or less.

9. The photo-luminescent visual element of claim 8 further characterized in that the first wavelength is smaller than about 400 nanometers.

10. The photo-luminescent visual element of claim 8 further characterized in that the second wavelength is greater than said first wavelength and less than about 700 nanometers.

11. The photo-luminescent visual element of claim 8 further characterized in that each of the second wavelength and the third wavelength are greater than said first wavelength and less than about 700 nanometers.

12. The photo-luminescent visual element of claim 8 further characterized in that each of the second wavelength, the third wavelength, and the fourth wavelength are greater than said first wavelength and less than about 700 nanometers.

13. The photo-luminescent visual element of claim 8 further characterized in that the first, the second, and the third photo-luminescent pigments are arranged on said planar substrate in a plurality of photo-luminescent pigment regions.

14. The photo-luminescent visual element of claim 13 further characterized in that a portion of said plurality of photo-luminescent pigment regions are non-overlapping.

15. A photo-luminescent visual element comprising:
    a) a planar substrate having both a viewing side and a pigment side;
    b) a first photo-luminescent pigment coupled to said planar substrate proximate to said pigment side; said first photo-luminescent pigment operative to receive an incoming electromagnetic radiation at a first wavelength and, in response, emit an outgoing electromagnetic radiation at a second wavelength that is within the human visible spectrum;
    c) a second photo-luminescent pigment coupled to said planar substrate proximate to said pigment side, said second photo-luminescent pigment operative to receive incoming electromagnetic radiation at said first wavelength and, in response, emit an outgoing electromagnetic radiation at a third wavelength that is within the human visible spectrum;

d) a third photo-luminescent pigment coupled to said planar substrate proximate to said pigment side, said third photo-luminescent pigment operative to receive incoming electromagnetic radiation at said first wavelength and, in response, emit an outgoing electromagnetic radiation at a fourth wavelength that is within the human visible spectrum;

e) said planar substrate shaped such that at least a portion of said outgoing electromagnetic radiation passes through said viewing side;

f) said planar substrate further characterized in that it is substantially transparent to said second wavelength; the planar substrate further characterized in that it is, at least, partially opaque to said first wavelength;

g) said first wavelength further characterized in that it is smaller than about 400 nanometers;

h) said second wavelength further characterized in that it is greater than said first wavelength and less than about 700 nanometers.

16. The photo-luminescent visual element of claim 15 further characterized in that the third wavelength is greater than said first wavelength and less than about 700 nanometers.

17. The photo-luminescent visual element of claim 15 further characterized in that each of the third wavelength and the fourth wavelength are greater than said first wavelength and less than about 700 nanometers.

* * * * *